July 8, 1941.  W. E. VECSEY  2,248,901
TIRE CORD
Filed April 12, 1937

INVENTOR
William E. Vecsey
BY Evans & McCoy
ATTORNEYS

UNITED STATES PATENT OFFICE 2,248,901

TIRE CORD

William E. Vecsey, Barnesville, Ga., assignor to The General Tire & Rubber Company, Akron, Ohio, a corporation of Ohio Application April 12, 1937, Serial No. 136,289

4 Claims. (Cl. 152—359)

This invention relates to pneumatic tires and more particularly to the cord fabric employed in the tire carcass.

In cord fabrics employed to reinforce pneumatic tire casings it is important that the cords have high tensile strength, that there be good adhesion between the cords and the rubber, and that the cords be capable of resisting the repeated bending stresses to which they are subjected in service. Poor adhesion with the rubber results in what is termed as ply separation and deterioration of the cords due to repeated bending is termed fatigue.

In pneumatic tires which are subjected to considerable heat during operation, the cords of the fabric reinforcement suffer material reduction in tensile strength and fatigue-resisting properties. Cotton cords are used almost exclusively in the manufacture of pneumatic tire casings and in the case of heavy duty tires such as used on trucks and buses the deterioration of the fabric due to heat is a serious defect, since the tensile strength of cotton cord may be decreased as much as 25 per cent due to heat.

It is an object of the present invention to provide a tire reinforcing cotton cord which is heat-resistant by reason of the fact that the strength and fatigue-resisting qualities of the cord are not impaired by heating of the tire in service.

A further object is to provide a cotton tire reinforcing cord in which the yarn has been so treated that the cord is heat-resistant and of a strength in bone-dry or heated condition at least equal to the normal strength of the cord.

Figure 1:
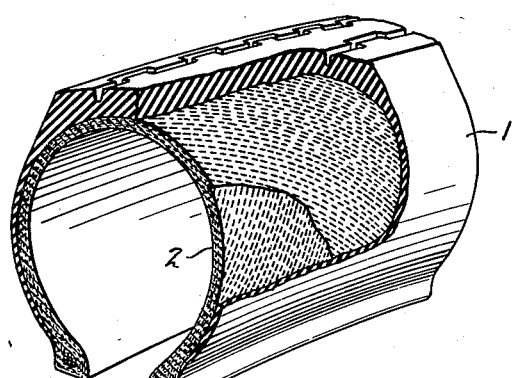
Figure 1 is a fragmentary view showing a portion of a tire reinforced with cord fabric.
Figure 2:
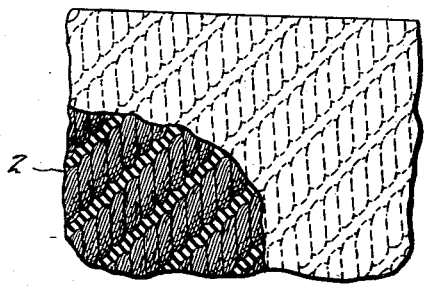
Fig. 2 is a plan view of a piece of tire reinforcing fabric such as may be made by the method of the present invention and suitable for use in reinforcing tire casings.
Figure 3:
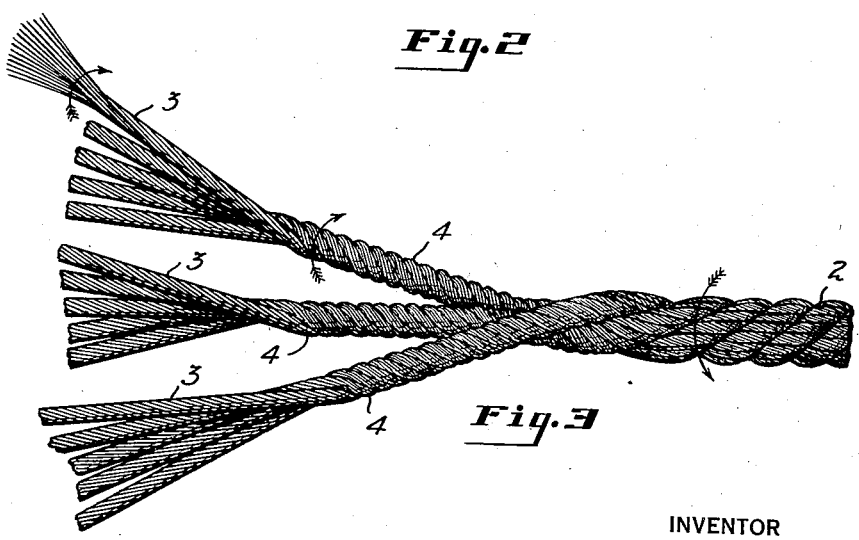
Fig. 3 is a view showing one of the cords of which the fabric is made.

Referring to the accompanying drawing, the pneumatic tire 1 is reinforced by parallel diagonally extending cords 2 which may be unconnected, as shown in Fig. 2, or which may be connected by weak weft threads. The individual cords 2 are preferably formed with a low yarn twist 3 and a high ply twist 4, as disclosed in my co-pending application Serial No. 53,926 filed December 11, 1935, upon which Patent No. 2,116,937 was granted May 10, 1938.

It is to be understood, however, that the advantages of the present invention are obtained regardless of the particular cord construction or the twist employed in making the cord and that any suitable twist may be employed.

I have discovered that cords made from cotton yarn mercerized in a caustic soda bath are less affected in strength and fatigue-resisting qualities by the loss of their normal moisture content from heat, for instance, than cords made from ordinary cotton yarn. While this is true generally of cords made from mercerized yarn, I have found that the cords retain their strength upon loss of moisture content to a greater degree if the yarn is mercerized without either the boiling or bleaching operations which are usually employed in mercerizing yarn to increase its luster. It is considered preferable that the mercerizing and subsequent neutralizing, washing and drying operations should be carried on with the yarn subjected to minimum tension, but greatly improved results are obtained even when the mercerizing is done on tensioned yarn.

I have found that cords made from mercerized yarn have a tensile strength in bone-dry condition substantially in excess of the normal tensile strength with 6½ per cent moisture regain, whereas unmercerized cord of the same construction loses about 20% of its tensile strength.

In tires constructed with reinforcing cords made as above described it has been found that the life of the tire is materially increased under severe operating conditions in which the tire carcass is subjected to considerable heat over long periods of time, as in bus and truck service. The life of such tires is materially increased by reason of the heat-resistant quality of the cords embodying this invention.

It will be apparent that the present invention provides a means for materially prolonging the life of heavy duty tires such as those used in truck and bus service and materially decreases the danger of tire failure due to excessive heating, which has heretofore been a common occurrence with tires of the character referred to.

While the advantages of the invention are particularly important in connection with truck and bus tires, the same advantages are obtained in connection with automobile tires.

What I claim is:

1. A pneumatic cord tire having a carcass comprising heat resistant fabric disposed in superposed plies, each consisting of closely spaced parallel cords made from mercerized cotton yarn.

2. A pneumatic cord tire having a carcass comprising fabric disposed in superposed plies, each ply consisting of closely spaced parallel cotton cords made heat resistant by mercerization.

3. A pneumatic cord tire having a carcass comprising superposed plies of closely spaced parallel cords made from cotton yarn which has been made heat resistant by mercerization under low tension.

4. A pneumatic cord tire having a carcass comprising superposed plies of closely spaced parallel cords made from cotton yarn which has been made heat resistant by mercerization under low tension and with no boiling or bleaching of the yarn.

WILLIAM E. VECSEY.